United States Patent [19]

Durand et al.

[11] 4,339,412

[45] Jul. 13, 1982

[54] APPARATUS FOR REDUCING THE CHANCES OF IGNITION AND EXPLOSION DUE TO THE DECOMPOSITION OF HIGH-PRESSURE INDUSTRIAL PROCESS GASES

[75] Inventors: Pierre Durand, Neuilly sur Seine; Guy Jouffroy, Saint Arnoult Par Caudedec en Caux, both of France

[73] Assignee: Societe Chimique des Charbonnages - CdF Chimie, Paris, France

[21] Appl. No.: 143,635

[22] Filed: Apr. 25, 1980

[30] Foreign Application Priority Data

Apr. 25, 1979 [FR] France .................. 79 10443

[51] Int. Cl.³ .................. G05B 9/00; C08F 2/34; C08G 85/00
[52] U.S. Cl. .................. 422/117; 422/113; 422/131; 422/242; 526/71
[58] Field of Search .................. 422/117, 113, 131, 242

[56] References Cited

U.S. PATENT DOCUMENTS

| | | | |
|---|---|---|---|
| 2,317,838 | 4/1943 | Weaver | 422/117 X |
| 2,871,106 | 1/1959 | Crowley et al. | 422/117 |
| 3,781,256 | 12/1973 | Sadee et al. | 526/71 |
| 3,871,458 | 3/1975 | Dumazet | 55/226 X |
| 4,115,638 | 9/1978 | Becker et al. | 526/352.2 |
| 4,255,387 | 3/1981 | Gardner | 422/113 |

Primary Examiner—Barry Richman

Attorney, Agent, or Firm—Finnegan, Henderson, Farabow, Garrett & Dunner

[57] ABSTRACT

The danger of explosion due to decomposition of high-pressure industrial process gases, such as ethylene, is reduced by maintaining in an inert atmosphere at least part of an evacuation system included between a pressurized vessel within which the decomposition may take place, on the one hand, and the atmosphere, on the other.

The evacuation system to the atmosphere for the gases contained in the high-pressure vessel, includes (1) an evacuation pipe adjacent to the vessel;
(2) a safety means separating the evacuation pipe from the vessel;
(3) a sealing means located in the evacuation path of the gases and occupying the entire cross-section of the evacuation pipe;
(4) a first gas supply circuit connected by a pipe to that part of the evacuation pipe that is located between the safety means and the sealing means, and means for the first supply pipe to control the volume of gas supplied by the first supply circuit; and
(5) a second gas supply circuit connected by a pipe to the sealing system, and means for the second supply pipe to control the volume of gas fed by the second supply circuit.

The apparatus is useful for the recovery of decomposition products for the purpose of averting atmospheric pollution, as well as for reducing the risk of explosion.

4 Claims, 1 Drawing Figure

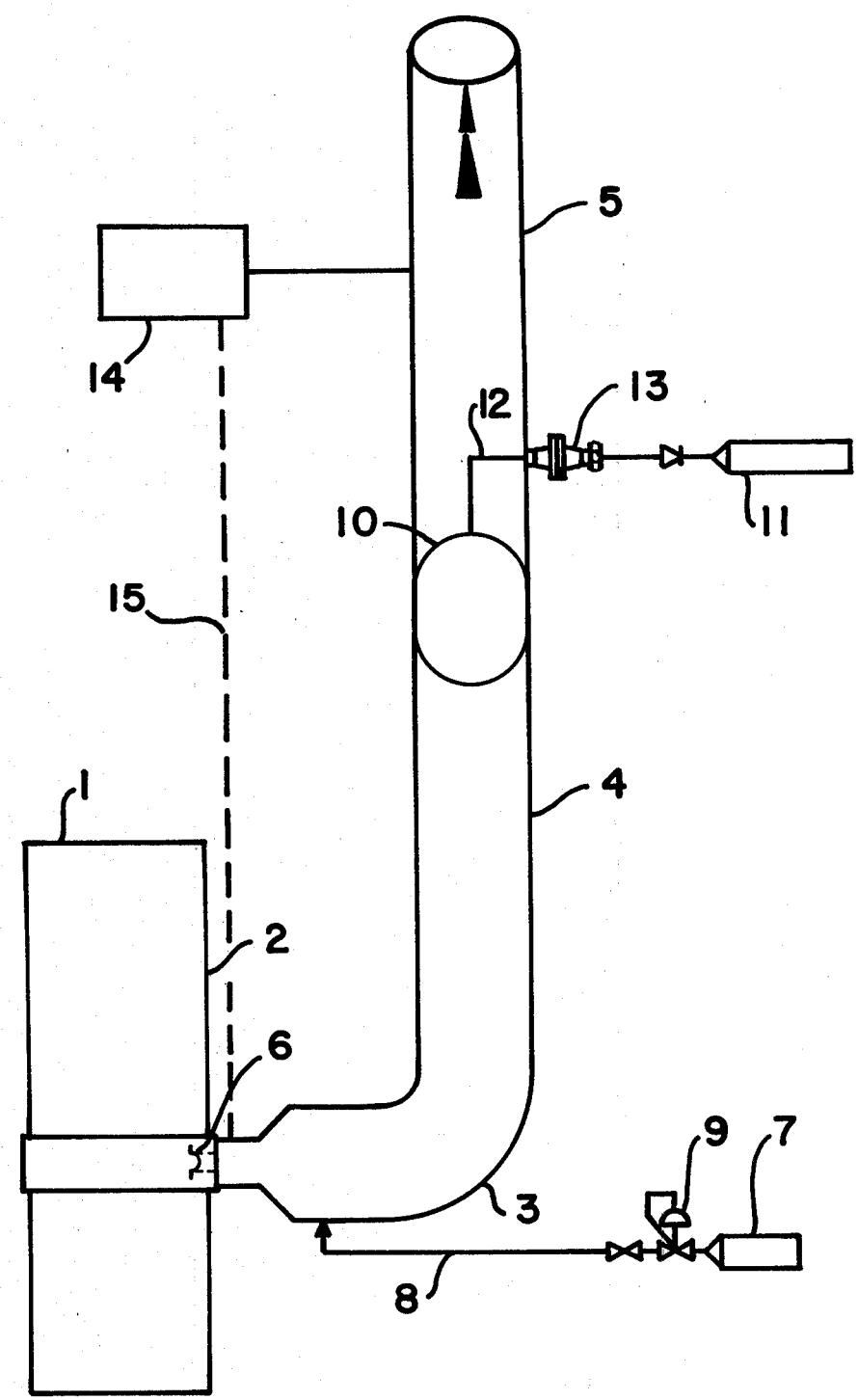

APPARATUS FOR REDUCING THE CHANCES OF IGNITION AND EXPLOSION DUE TO THE DECOMPOSITION OF HIGH-PRESSURE INDUSTRIAL PROCESS GASES

BACKGROUND OF THE INVENTION

The present invention relates to a process and apparatus for reducing the danger of ignition and explosion from the decomposition of industrial process gases under high pressure, such as ethylene in a high-pressure polymerization plant.

It is well known that there is a danger of explosion in the presence of unstable industrial process gases maintained under pressure that are subject to decomposition. For example, it is well known that in the course of polymerizing ethylene at high pressure (approximately 300 to 3,000 bars) and at high temperature (approximately 150° C. to 350° C.), some operational difficulties such as mechanical failures or insufficient purity in the gaseous ethylene, despite careful monitoring of the pressure and temperature indicators, may result in heating a fraction, even if small, of the ethylene contained in the polymerization reactor or in the separator (operating ordinarily at a pressure between 100 and 500 bars) to a temperature exceeding about 450° C. Such heating is enough to initiate the decomposition of that fraction of ethylene into a mixture of carbon, hydrogen, and methane. Furthermore, the above-cited operating conditions for the reactor and the separator are such as to allow a rapid propagation of any initiated decomposition, invariably resulting in rapid increases in pressure and/or temperature. The reactor and separator are protected against excessive pressure by the rupture of at least one member (disk, valve, relief vent) with a safety function, whereby the decomposition products can escape into the atmosphere. Besides the polluting effect of the expulsion into the atmosphere of the pulverulent carbon, the ignition of the decomposition gases must especially be feared, because it causes violent explosions capable of material damage and human injury.

Several solutions to this problem of deleterious ignition and its consequences, seeking to meet safety requirements in case of decompression of high-pressure polymerization plants, already have been proposed, in particular by U.S. Pat. Nos. 3,781,256, 3,871,458, and 4,115,638, and by the Japanese patent application Nos. 48-51.336/73 and 48-51.337/73 filed on May 9, 1973. All these solutions have in common that they remedy at least one of the three presumed conditions for the ignition of decomposition gases: high pressure, high temperature, and supersonic velocity of the gases. Therefore these solutions generally consist in cooling by various means the decomposition gases of which the initial temperature—as noted above—exceeds 450° C., and may in fact reach 1,500° C. Besides, in order to prevent polluting the ambient atmosphere by the decomposition gases, the recommendation is made to lower the pressure and/or the velocity of the gases below the speed of sound. In short, all these solutions are based on the hypothesis stated in the U.S. Pat. No. 3,781,256, namely that the problem of the ignition of the decomposition gases is reduced to the problem of auto-ignition of these gases due to their own high temperature.

Now the applicants have unexpectedly discovered that contrary to the teachings of the prior art, the auto-ignition of the decomposition gases due to their own high temperature is not necessarily the main cause of ignition in these gases and most of the time is only a secondary cause. This discovery results from experiments carried out on ethylene in the absence of decomposition in a reactor using rupture tests of at least one safety means, the ethylene temperature at the time immediately preceding the rupture not exceeding 200° C. These experiments have shown that despite the absence of anomalous heating prior to rupture of the safety means, an emission of flaming gas at the discharge of the evacuation pipe (chimney) and the presence of a shock wave, which propagates at a rate of approximately 500 to 700 m/s, are noted.

The observed phenomenon might be explained as follows. After the safety means has been ruptured, air contained in the evacuation pipe (chimney) and initially at rest is passed by a pressure wave moving at a velocity that depends on its intensity and exceeds that of sound in the medium. This pressure wave therefore precedes the flow of the ethylene or of the decomposition gases in the evacuation pipe, and compresses and heats the air contained in the pipe. Further, since in general the evacuation pipe is not wholly linear but comprises at least either a curved section joining the side wall of the reactor or separator to the vertical section of the chimney or a variation in cross-section, the pressure wave as a rule will not be planar and therefore can be reflected from the walls of the evacuation pipe. These wave reflections permit wave focusing on the axis of symmetry of the pipe and therefore the heating of particular point locations in the evacuation pipe. Lastly, the possibility of successive reflections of the safety disk onto the walls of the chimney represents a third source of local heating together with that from the pressure wave and combines its effects with the others.

The heating phenomena described above suffice, even in the absence of any ethylene decomposition, to raise the temperature at particular points in the chimney to above 600° C. The diffusion phenomena, the differences in gas flow speeds in the chimney between its walls and its axis of symmetry, the variations in cross-section, and the changes in the direction of the stack contribute locally to form pre-mixing zones of air and gas. Ignition is initiated at the hot-air/ethylene interface, which moves at a speed less than that of the pressure wave and therefore lags this wave, and more precisely at the level of these pre-mixing zones. The pre-mixing zones thereafter are carried by the evacuation to the outside of the chimney; therefore they disappear rapidly from the chimney when the air is replaced by the gas. Similarly the flame is carried by the flow toward the exhaust section of the chimney, where it remains during the entire period of evacuation. Gas ignition by the pressure-wave effect as just described is enhanced by a high temperature of the gas, whereby the temperature of the air-gas mixture is increased, and consequently a decomposition gas is more likely to ignite by the pressure-wave effect than ethylene at 200° C. This increase in the temperature of the air-gas mixture thus demonstrates that auto-ignition of decomposition gases caused by their own temperature—previously considered to be the root cause of ignition—instead is a derived and secondary effect from the pressure wave.

All the previous art solutions for the ignition problem that are described in the above-cited patents sought to cool the decomposition gases either when being evacuated into the atmosphere or when being recovered.

These solutions therefore failed to adequately take into account the time-parameter of the mechanism from the opening of the safety means to the end of the evacuation. This parameter, however, was found to be of crucial importance as shown by the work of applicants. The cited patents state that the duration of evacuation as a rule is between 3 and 10 seconds, and U.S. Pat. No. 3,781,256 states that the time between opening the safety means and the arrival of the gas at the cooling system is about 50 to 100 milliseconds. Under these conditions, it is not surprising that the effectiveness of the prior art solutions should have been inadequate, because, in view of applicants' observations, the duration of the non-steady-state flow phase resulting in the pressure wave effect generally is equal to or less than 25 milliseconds. Considering the discovery of the nature and the duration of the main cause of the ignition of the decomposition of gases under high pressure, such as ethylene in high-pressure polymerization equipment, the effectiveness of a process and apparatus in reducing the risk depends less on the magnitude of the implementing means than on the time of implementation. In particular, it should be noted that the recovery process of the decomposition products described in U.S. Pat. No. 4,115,638 is of a highly uncertain effectiveness when the chances of ignition are not eliminated at the discharge of the reactor or separator.

SUMMARY OF THE INVENTION

A first object of the invention is therefore to reduce the danger of ignition and consequently of explosion due to the decomposition of high-pressure industrial process gases, in particular the danger arising during the non-steady-state flow phase of the decomposition gases. A second object is to minimize the chances of ignition and explosion in the course of the non-steady-state flow phase to such a degree that the recovery of the decomposition gases, in particular for the purpose of averting any pollution, can be carried out in a perfectly safe manner.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the process of the invention for reducing the danger of ignition and explosion due to the decomposition of industrial processes gases under high pressure comprises maintaining in an inert atmosphere at least part of an evacuation system between a vessel under pressure in which industrial process gas decomposition may happen on the one hand, and the atmosphere, on the other.

Further to achieve the foregoing objects and in accordance with the purpose of the invention, as embodied and broadly described herein, the apparatus of the present invention for evacuating to the atmosphere the gases contained in a high-pressure vessel comprises (1) an evacuation pipe adjacent to the vessel;
(2) a safety means separating the evacuation pipe from the vessel;
(3) a sealing means located in the evacuation path of the gases and occupying all of the cross-section of the evacuation pipe;
(4) a first gas supply circuit connected by a pipe to that part of the evacuation pipe located between the safety means and the sealing means, and means for the first supply conduit to control the volume of the gas fed by the first supply circuit; and
(5) a second gas supply circuit connected by a pipe to the sealing means, and means for the second supply pipe to control the volume of gas fed by the second supply circuit.

In a preferred embodiment of the process and apparatus of the invention, the industrial process gas is ethylene in a high-pressure polymerization plant.

The accompanying drawing, which is incorporated in and constitutes a part of this specification, illustrates one embodiment of the invention and, together with the description, serves to explain the principles of the invention.

BRIEF DESCRIPTION OF THE DRAWING

The FIGURE is a schematic diagram of a system constructed in accordance with the present invention.

DESCRIPTION OF THE PREFERRED EMBODIMENTS

Reference will now be made in detail to the presently preferred embodiments of the invention, an example of which is illustrated in the accompanying drawing.

In accordance with the invention, the industrial process gas may be any gas held in a vessel under high pressure that is subject to decomposition and the danger of ignition and explosion. The invention is especially useful in reducing the risk of explosion from the decomposition of ethylene in high-pressure polymerization equipment. The invention will therefore be described in detail with respect to the decomposition of ethylene. It will be understood by those of ordinary skill in the art, however, that the process and apparatus described herein may easily be applied to reducing the risk of explosion from decomposition of other high-pressure industrial process gases.

The expression "to maintain in an inert atmosphere at least part of the evacuation system," in accordance with the invention, means that an inert atmosphere prevails in this part of the evacuation system before the safety means of the pressurized vessel opens, that is, during normal operation of the vessel. As embodied herein, after the safety means is open, the evacuation of the gases eliminates the device by which the inert atmosphere is maintained, whereby the atmosphere in the protected part of the evacuation system is disturbed by the gradual entry of atmospheric air.

An inert atmosphere in accordance with the invention is one essentially free of gases reacting with the decomposition gases (methane and hydrogen in the preferred embodiment) and in particular substantially free of oxygen. For example, such an atmosphere could consist of a so-called inert gas like nitrogen, or carbon dioxide, or a rare gas (argon, helium, neon, krypton, xenon). In accordance with the invention, at least part, preferably the major part and to the extent possible all of the evacuation system must be maintained in an inert atmosphere. It is further preferred that the part of the evacuation system that is directly adjacent to the high-pressure vessel (reactor or separator in the case of ethylene polymerization) wherein ethylene decomposition may take place and that the part of the evacuation system that is nearest to the outside, i.e., the end of the chimney, be maintained in an inert atmosphere.

It should be noted that the process of the invention requires only slight modification of the conventional gas evacuation apparatus, for instance the chimney type. Indeed the process of the invention will be the more effective in reducing the chances of ignition and explosion during the non-steady-state flow phase of evacuation the lower the pressure of the inert gas in the evacuation system. Consequently the inert gas pressure should preferably be less than or equal to 1.5 bars. Accordingly the process of the invention may be implemented in a simple manner, for instance by arranging a sealing device across the evacuation system and preferably near its exhaust into the atmosphere, the space between the sealing device and the safety means of the high-pressure vessel being filled with at least one inert gas at a pressure of or less than 1.5 bars. An example of such a sealing device is a rubber inflatable balloon filled with a gas at a pressure exceeding that in the evacuation system but still equal to or less than 2 bars. The gas inside the balloon preferably is an inert gas as defined above.

The process of the invention may be combined with known processes or equipment for reducing the chances of ignition and explosion from the decomposition of high-pressure industrial process gases, such as ethylene, in particular with the processes or equipment for cooling the decomposition gases, such as are described for instance in U.S. Pat. Nos. 3,781,256 and 3,871,458. Such a combination improves the effectiveness of the known techniques by allowing more rapid cooling, because the process of the invention immediately reduces and even avoids the uncontrolled heating of these gases above their ignition temperature (about 600° C. in the case of ethylene). The process of the invention also may be combined with known recovery processes for decomposition products, for instance that described in U.S. Pat. No. 4,115,638, whereby the safety of the prior process is improved.

The invention will be better understood by referring to the schematic illustration in the drawing. In the embodiment shown, reference 1 denotes the high-pressure vessel, which, as embodied herein, is arranged vertically, and in which either a polymerization reaction of ethylene (reactor) or the separation of polyethylene and unreacted ethylene (separator) may be carried out. Generally this vessel is of cylindrical or tubular shape.

The vessel, as embodied herein, is connected by one of its side walls 2 to an evacuation pipe of the chimney type—because of the possibility of any emergencies during which its contents must be quickly evacuated into the atmosphere—the chimney comprising in this embodiment a first curved section 3 immediately adjacent to the vessel, a median section 4, and an upper section 5, the latter two sections being arranged vertically. Section 3 is necessary only when vessel 1 is arranged vertically. If vessel 1 is arranged horizontally, as is the case for a tubular reactor, section 3 is no longer required.

In accordance with the invention, the evacuation pipe and the vessel are separated by a safety means. As embodied herein, enclosure 1 and section 3 (or section 4 if there is no section 3) are separated by a safety disk 6 shown schematically in the drawing and adjusted to a rupture pressure higher than the maximum pressure of normal operation of vessel 1.

An inert gas supply circuit 7, for instance nitrogen, is connected to the section 3 of the chimney by a first supply pipe 8. In accordance with the invention, means are provided to control the volume of gas supplied by the first supply circuit. As embodied herein, a valve 9 controls the volume of inert gas fed to the evacuation pipe, and consequently the pressure inside it, which should preferably remain equal to or less than 1.5 bars.

Further in accordance with the invention, a sealing means is provided in the evacuation path of the gases and occupies the entire cross-section of the evacuation pipe. As embodied herein, a rubber balloon 10 occupying the entire cross-section of the evacuation pipe separates sections 4 and 5 of the pipe. In the illustrated embodiment, a preferably inert gas supply circuit 11, for instance of nitrogen, is connected to the balloon 10 by a pipe 12 in which is located, in accordance with the invention, a means, embodied herein by intake means 13, for controlling the amount of gas fed to the balloon 10, and consequently the pressure in sections 3 and 4 of the chimney, which preferably is less than 2 bars. For instance when the pressure at 3 is adjusted to 1.2 bars, the pressure at 10 may be set at 1.4 bars.

The sealing means of the evacuation pipe used within the scope of the invention is advantageously constituted by, as described above, a rubber inflatable means. Thus, the apparatus of the invention is of a simple design and its implementation involves only known components and techniques. Its maintenance is also quite simple.

The apparatus of the invention further may comprise means 14 for injecting a coolant into the evacuation pipe either above or below the sealing means, the coolant injection means being controlled by a system, schematically illustrated by broken line 15, detecting the opening of the safety means. When an untimely start of the detection system is feared, or when the geometry of the evacuation pipe is such that the coolant can make contact with the safety means and thereby weaken it by thermal shock, or might partly clog the evacuation pipe, the injection means preferably is located in that part of the evacuation pipe that is above the sealing means.

The apparatus described and illustrated above, when used within the scope of the invention, permits full achievement of the objects of the invention, namely reduction of the frequency of ignitions and explosions due to the decomposition of high-pressure industrial process gases, such as ethylene in high-pressure polymerization plants, and recovery of the decomposition products under adequate safety conditions.

It will be apparent to those skilled in the art that various modifications and variations could be made in the process and apparatus of the invention without departing from the scope or spirit of the invention. In particular, although the invention has been described for the purpose of illustration with respect to ethylene, it is equally applicable to other industrial process gases, as will be readily understood by those having ordinary skill in the art.

What is claimed is:

1. Apparatus for evacuating to the atmosphere reactive and/or decomposable gases contained in a high-pressure enclosure, comprising
   (a) a high pressure enclosure,
   (b) an evacuation conduit adjacent to said enclosure;
   (c) pressure-responsive safety means separating said evacuation conduit from said enclosure for automatically providing an evacuation flowpath from said enclosure to said evacuation conduit when the pressure in the enclosure exceeds a predetermined value;

(d) sealing means located downstream of said safety means in the evacuation path of the gases and occupying all of the cross-section of the evacuation conduit, said sealing means automatically providing an evacuation flowpath from said evacuation conduit when the pressure in the evacuation conduit exceeds a predetermined value; and (e) a first inert gas supply circuit connected by a conduit to that part of the evacuation conduit located between the safety means and the sealing means, and means for said first supply conduit to control the volume of inert gas fed by said first supply circuit.

2. Apparatus according to claim 1 wherein the sealing means is an inflatable sealing means, and further comprising (e) a second gas supply circuit connected by a conduit to the sealing means, and means for the second supply conduit to control the volume of gas fed by said second supply circuit.

3. Apparatus according to claim 1 or claim 2, further comprising means for injecting a coolant into the evacuation pipe, and means for controlling said injection means by detecting the opening of the safety means.

4. Apparatus according to claim 3, wherein said injection means are located in that part of the evacuation pipe that is downstream of the sealing means.

* * * * *